July 10, 1934.

E. E. LINDSEY 1,965,901

DEVICE FOR THE MAKING OF EDIBLE ICES

Filed Aug. 19, 1932

INVENTOR.
ERNEST E. LINDSEY.
BY Donald K. Lippincott
ATTORNEY.

Patented July 10, 1934

1,965,901

UNITED STATES PATENT OFFICE 1,965,901

DEVICE FOR THE MAKING OF EDIBLE ICES

Ernest E. Lindsey, San Francisco, Calif.

Application August 19, 1932, Serial No. 629,532

12 Claims. (Cl. 62—174)

My invention relates to improvements in devices for the making and freezing of edible ices such as ice creams, sherbets, fruit ices, water ices and like mixtures, hereinafter to be known as confections, wherein and whereby said confections are prepared ready for use almost instantly and when so prepared have a different and more delicious appeal to the sense of taste than when made in the usual and customary manner, and where the device itself may also be used as a display device.

Among the objects of my invention are: To provide a personal service to the customer in that through the use of my device an unlimited choice of flavors, sweetenings, etc., may be had, something not commercially practicable in the usual and customary present methods; to provide a convenient method of manufacture which makes unnecessary large storage space for the keeping of large quantities of frozen material on hand; to provide economy of production, in that no heavy and expensive equipment for the making of the confections or for freezing the same are required, and a small merchant is placed in practically as advantageous position as a larger one in the matters of operation and production; to provide portability and cheapness of installation, and thereafter of moving from place to place if found desirable; to provide also a device which is sanitary and easily kept clean and which, being exposed to public view will of necessity be maintained in an immaculate condition; to provide great flexibility in production, as units may be added as needed; and to provide a means of manufacturing a frozen confection having a minimum grain, or crystal content.

Other objects of my invention will be apparent or will be specifically pointed out in the description forming a part of this specification, but I do not limit myself to the embodiment of my invention herein described, as various forms may be adopted within the scope of the claims.

In broad terms, my invention comprises a surface which is cooled below the freezing point of unfrozen confections. The unfrozen material is deposited on this surface in a fine spray to form a thin layer which freezes almost instantly. I prefer to provide means of depositing a multiplicity of such thin layers, one upon another, until I have built up a deposit of substantial thickness. I then peel off this accumulated frozen confection, which, because of its deposition in such a fine spray, and in such thin layers, has crystals of minute size only, which are too small to give any sense of graininess when eaten. The sprayed particles, freezing upon impact, can produce ice crystals no larger than themselves, and the crystals do not extend beyond the particles, nor between the layers, and the resultant deposit is flexible and plastic even at extremely low temperatures.

Referring to the drawing which illustrates a preferred portable embodiment of my invention:

Figures 1, 2:
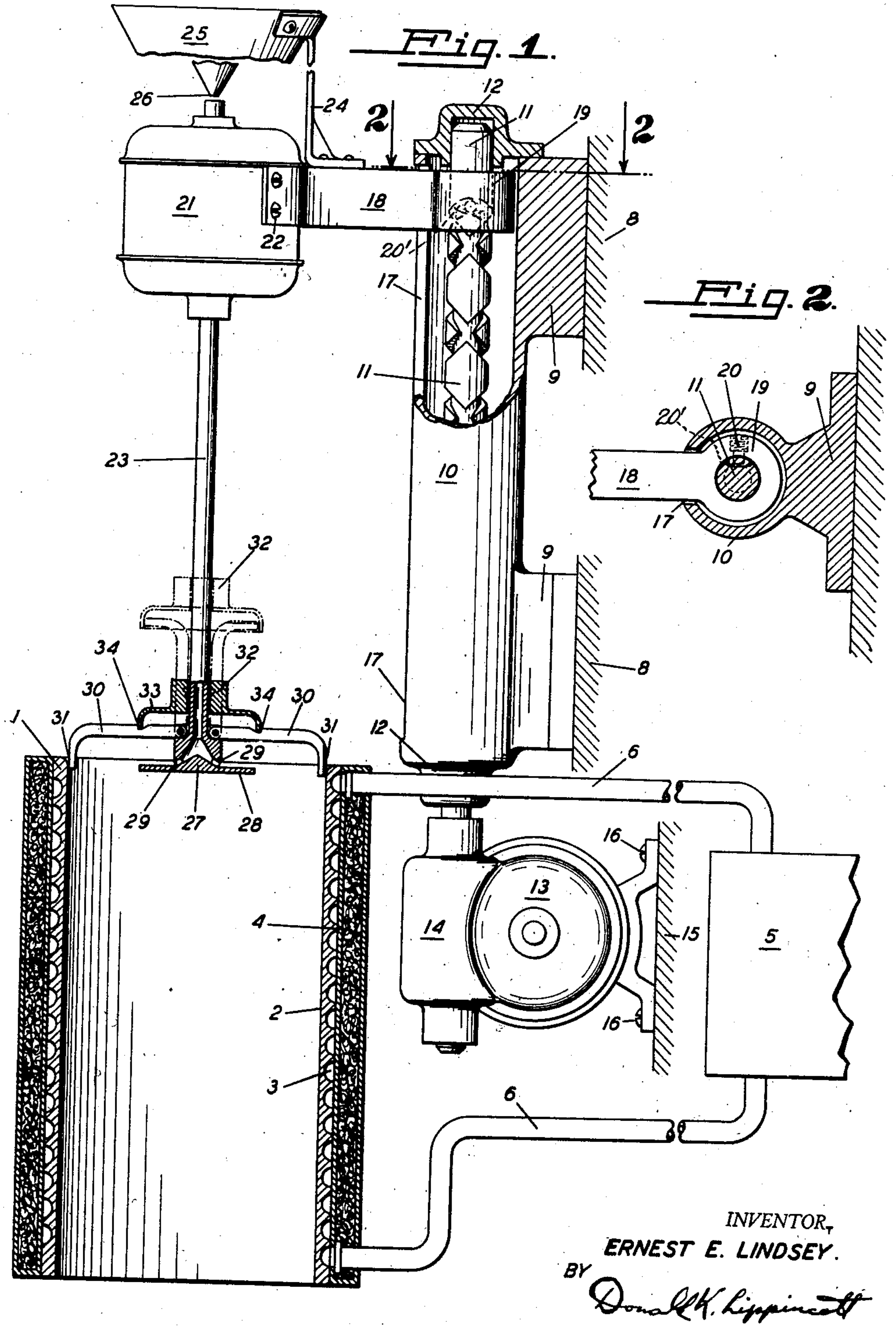
Figure 1 is a longitudinal sectional view of the device as fastened to a wall, partly in section and partly in elevation.
Figure 2 is a cross sectional view of the oscillating mechanism, taken from a plane indicated by the line 2—2 in Figure 1.

I prefer to provide a metal cylinder 1, having a smooth inner surface 2, with an outer spiral semi-circular thread 3. This thread is covered with a shrunk-on sleeve 4 so that a tight brine channel is formed which may then be connected to the circulating system of a refrigerator 5 by pipes 6—6. I cover the outer surface of the cylinder with a layer of insulation 7 to prevent temperature losses.

Fastened to a wall 8 by brackets 9—9 is an oscillator cylinder 10 containing a double threaded shaft 11, held by bearings 12—12, driven by an oscillator motor 13 through a reduction gear 14. The motor is fastened to a support 15 by screws 16.

The cylinder 10 is provided with a longitudinal slot 17 through which enters a sprayer bracket 18 carrying an integral bearing head 19. A thread stud 20 is screwed in the bearing head to carry a cam follower 20' adapted to enter the threads of the shaft 11. This follower is loosely pivoted on the stud 20 and is long enough to bridge the thread crossings.

A spray motor 21 is secured to the sprayer bracket 18 by screws 22, and is provided with a long hollow shaft 23. Fastened to the sprayer bracket by a funnel bracket 24 is a funnel container 25 whose small orifice 26 is directly over the upper end of the hollow shaft.

The lower end of the hollow shaft is provided with a centrifugal spray nozzle 27 comprising a flat spray plate 28 to which the liquid confections are conveyed by holes 29—29.

The nozzle is positioned coaxially within the cylinder and so disposed that when the sprayer bracket is at the top of its stroke on the double threaded shaft, the nozzle is at the top of the cylinder. The length of stroke of the bracket is also equal to the length of the cylinder.

Also mounted on the lower end of the shaft are two hinged paring arms 30—30. These extend at right angles to the shaft and are provided with cutting edges 31—31, and are held in their angular position by a weight 32 having a skirt 33 which drops into notches 34—34 on the arms to lock them into position.

During the deposition of the liquid confection, I prefer to remove these arms from their paring position, so I fold them up against the shaft, drop the weight over them, so that the skirt prevents them from falling. This arrangement is indicated by the dotted lines in Figure 1.

The refrigeration system having been turned on in order to lower the temperature of the inner surface below that necessary to freeze the confections, the scraper arms are then locked in the non-scraping position. Both motors are started, whereupon the nozzle 27 is rapidly whirled, while being at the same time oscillated back and forth within the cylinder, repeatedly traversing the entire surface, due to the action of the double threaded shaft on the sprayer bracket.

A charge of unfrozen confection is placed in the funnel container. The confection flows through the hollow shaft onto the spinning plate of the nozzle, is centrifugally sprayed or atomized in a fine deposit on the inner surface of the cylinder. It freezes substantially on impact and as the nozzle oscillates over its course a substantial deposit of frozen confection is accumulated in a multiplicity of layers on the inner surface of the cylinder. When the charge is exhausted, the motors are stopped, the paring arms dropped down, and the motors started again to peel the frozen material away from the surface. The cutting edges, fitting closely to the smooth surface of the cylinder, separate the flexible frozen layer from the surface, in the form of a spiral shaving, and as the frozen layer is flexible and plastic due to the lack of interlocking ice crystals, the shaving does not crumble, but holds its shape, to a greater or less degree depending on the speed of rotation of the arms and the consistency of the original mixture. While the curl of the shaving may not be in a complete unbroken spiral, it is not in the form of dust, or snow, but is usually in the form of broken sections of the paring of substantial area. The width of the paring is of course governed by the speed of progression of the arms through the cylinder. The removed frozen confection drops out through the open bottom of the cylinder into a dish or other serving utensil.

The device as described is ideally adapted for soda fountains, or like dispensaries, where individual portions of a frozen confection may be made at once before the customer's eyes. The time involved is no more than is usually taken up in serving from the usual container, and the process allows the raw materials to be kept in unfrozen form until needed for use.

I claim:

1. Means for making frozen confections comprising a cylinder having an inner surface adapted to be cooled, means for cooling said surface, a motor having a hollow shaft, a container for unfrozen confection at one end of said shaft, a centrifugal spray nozzle at the other end of said shaft, means for inserting said nozzle in said cylinder, means for traversing said inner surface with said nozzle so that a fine spray of unfrozen confection may be deposited on the entire area of said inner surface, and means attached to said nozzle to scrape said deposit from said surface when frozen.

2. Means for making frozen confections comprising a cylinder having an inner surface adapted to be cooled, means for cooling said surface, a motor having a hollow shaft, a container for unfrozen confection at one end of said shaft, a centrifugal spray nozzle at the other end of said shaft, means for inserting said nozzle in said cylinder, means for traversing said inner surface with said nozzle so that a fine spray of unfrozen confection may be deposited on the entire area of said inner surface, and a pair of arms attached to said nozzle to scrape said deposit from said surface when frozen.

3. Means for making frozen confections comprising a cylinder having an inner surface adapted to be cooled, means for cooling said surface, a motor having a hollow shaft, a container for unfrozen confection at one end of said shaft, a centrifugal spray nozzle at the other end of said shaft, means for inserting said nozzle in said cylinder, means for oscillating said nozzle lengthwise in said cylinder whereby a plurality of layers of confection may be deposited in a fine spray over the entire area of said inner surface, and a pair of arms attached to said nozzle to scrape said deposit from said surface when frozen.

4. Means for making frozen confections comprising a cylinder having an inner surface adapted to be cooled, means for cooling said surface, a motor having a hollow shaft, a container for unfrozen confection at one end of said shaft, a centrifugal spray nozzle at the other end of said shaft, means for inserting said nozzle in said cylinder, means for oscillating said nozzle lengthwise in said cylinder whereby a plurality of layers of confection may be deposited in a fine spray over the entire area of said inner surface, a pair of arms attached to said nozzle to scrape said deposit from said surface when frozen, and means for preventing said arms from scraping during the oscillating period.

5. The method of freezing a confection mixture in a metal sleeve having smooth inner walls, which comprises pre-cooling said walls below the freezing point of said mixture, atomizing the unfrozen mixture onto said walls in fine particles, building up a flexible layer of frozen confection of substantial thickness, said layer having ice crystals of the same order of size as said particles, and peeling said layer from said surface to form a frozen confection.

6. The method of freezing a confection mixture, which comprises applying the unfrozen mixture in an atomized spray to a rigid surface sufficiently cold to freeze the sprayed confection particles substantially on impact to form a flexible layer in which the ice crystals are of the same order of size as the sprayed particles, and peeling said layer from said surface in strips.

7. The method of freezing a confection mixture, which comprises applying said mixture in an atomized spray to a surface capable of instantly freezing the sprayed particles on impact to form a thin layer on said surface, and repeating said process to form additional separately frozen layers whereby a substantial thickness of frozen confection is built up having flexibility and plasticity due to the confinement of ice crystals within the limits of the sprayed particles.

8. The method of freezing confection mixtures, comprising repeatedly spraying said mixture in separate thin layers on a surface capable of freezing the atomized particles on impact to form a flexible deposit of frozen confection having a substantial thickness free from interlocking ice crystals.

9. The method of freezing confection mixtures, comprising repeatedly spraying said mixture in separate thin layers on a surface capable of freezing the atomized particles on impact to form a flexible deposit of frozen confection having a substantial thickness free from interlocking ice crystals, and peeling said deposit from said surface in strips.

10. Means for freezing a confection mixture, comprising a smooth metal surface adapted to be cooled, means for cooling said surface below the freezing point of said mixture, means for atomizing said mixture onto said surface to form a flexible layer thereon, and means for inserting a cutting edge between said surface and the frozen confection to peel the frozen confection from said surface.

11. Means for freezing a confection mixture, comprising a cylinder having a rigid smooth inner surface, said surface being adapted to be cooled below the freezing point of said mixture, means for atomizing said mixture onto said surface, to form a flexible layer thereon, and means for inserting a cutting edge between said surface and said layer to remove said layer from said surface.

12. Means for freezing confection mixtures, comprising a smooth metal surface adapted to be cooled below the freezing point of said mixture, means for spraying said mixture in the form of fine particles onto said surface in a plurality of layers to form a flexible frozen sheet thereon, and means for inserting a cutting edge between said surface and the frozen sheet to peel the sheet from said surface in strips.

ERNEST E. LINDSEY.